United States Patent
Desabhatla et al.

(10) Patent No.: US 10,337,348 B2
(45) Date of Patent: Jul. 2, 2019

(54) SYSTEMS AND METHODS FOR CONTROLLING A POWER GENERATION SYSTEM

(71) Applicant: General Electric Company, Schenectady, NY (US)

(72) Inventors: Sreedhar Desabhatla, Bavaria (DE); John Huey, Greenville, SC (US); Scott Szepek, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/470,271

(22) Filed: Mar. 27, 2017

(65) Prior Publication Data

US 2018/0274383 A1  Sep. 27, 2018

(51) Int. Cl.

| | |
|---|---|
| *F01D 15/10* | (2006.01) |
| *F01D 21/00* | (2006.01) |
| *H02P 9/10* | (2006.01) |
| *H02K 7/18* | (2006.01) |
| *G05B 15/02* | (2006.01) |
| *H02P 9/00* | (2006.01) |
| *H02P 101/00* | (2015.01) |

(52) U.S. Cl.
CPC ........... *F01D 15/10* (2013.01); *F01D 21/003* (2013.01); *G05B 15/02* (2013.01); *H02K 7/1823* (2013.01); *H02P 9/006* (2013.01); *H02P 9/102* (2013.01); *H02P 9/107* (2013.01); *F05D 2220/32* (2013.01); *F05D 2270/061* (2013.01); *F05D 2270/20* (2013.01); *F05D 2270/3061* (2013.01); *F05D 2270/31* (2013.01); *H02P 2101/00* (2015.01)

(58) Field of Classification Search
None
See application file for complete search history.

(56) References Cited

U.S. PATENT DOCUMENTS

| | | | | |
|---|---|---|---|---|
| 3,758,764 A | * | 9/1973 | Harner | ................. G05D 1/0005 60/39.281 |
| 6,216,437 B1 | * | 4/2001 | Hepner | ................... F01D 17/04 60/39.27 |
| 7,457,688 B2 | * | 11/2008 | Szepek | ..................... F02C 9/42 60/39.281 |
| 7,584,024 B2 | * | 9/2009 | Wroblewski | ......... G05B 13/027 700/300 |

(Continued)

*Primary Examiner* — Ramesh B Patel
(74) *Attorney, Agent, or Firm* — Eversheds Sutherland (US) LLP

(57) ABSTRACT

The disclosure relates to optimization of gas turbine power plant response during power system transients. In certain embodiments, systems, methods, and apparatus can control a power generating system by using the reactive components of the current and the reactive components of the voltage and the magnitude of the voltage at the generator terminals of a gas turbine generator system. In one embodiment, a system can identify a power system fault based on at least three conditions occurring for a specified duration and at substantially the same time: (1) an increase in the reactive current, (2) a decrease in the magnitude of the voltage, and (3) an increase in the reactive power. In one embodiment, a power system can further detect a remote breaker open (RBO) condition, and distinguish a RBO condition from a power system fault condition.

20 Claims, 6 Drawing Sheets

(56) References Cited

U.S. PATENT DOCUMENTS

| | | | | |
|---|---|---|---|---|
| 9,255,580 B2* | 2/2016 | Waugh | ................... | F04D 27/001 |
| 9,771,823 B2* | 9/2017 | Desabhatla | ............. | F01D 15/10 |
| 2005/0193739 A1* | 9/2005 | Brunell | ................ | G05B 13/042 |
| | | | | 60/772 |
| 2006/0178762 A1* | 8/2006 | Wroblewski | ......... | G05B 13/027 |
| | | | | 700/30 |
| 2010/0032964 A1* | 2/2010 | Hoffmann | ................ | F01D 15/10 |
| | | | | 290/40 B |
| 2011/0062708 A1* | 3/2011 | Prochaska | ............... | F02D 29/06 |
| | | | | 290/7 |
| 2012/0245753 A1* | 9/2012 | Forbes, Jr. | ............. | G06Q 10/00 |
| | | | | 700/295 |
| 2013/0261820 A1* | 10/2013 | Meier | ........................ | H02P 9/04 |
| | | | | 700/287 |
| 2013/0320937 A1* | 12/2013 | Desabhatla | ............. | H02P 9/102 |
| | | | | 322/58 |
| 2014/0293489 A1* | 10/2014 | Zhu | ........................... | H02J 3/28 |
| | | | | 361/18 |
| 2015/0377057 A1* | 12/2015 | Desabhatla | ............. | F01D 15/10 |
| | | | | 700/287 |
| 2017/0051723 A1* | 2/2017 | Kjær | ..................... | F03D 7/0284 |
| 2017/0346430 A1* | 11/2017 | Desabhatla | ............. | H02J 3/00 |

* cited by examiner

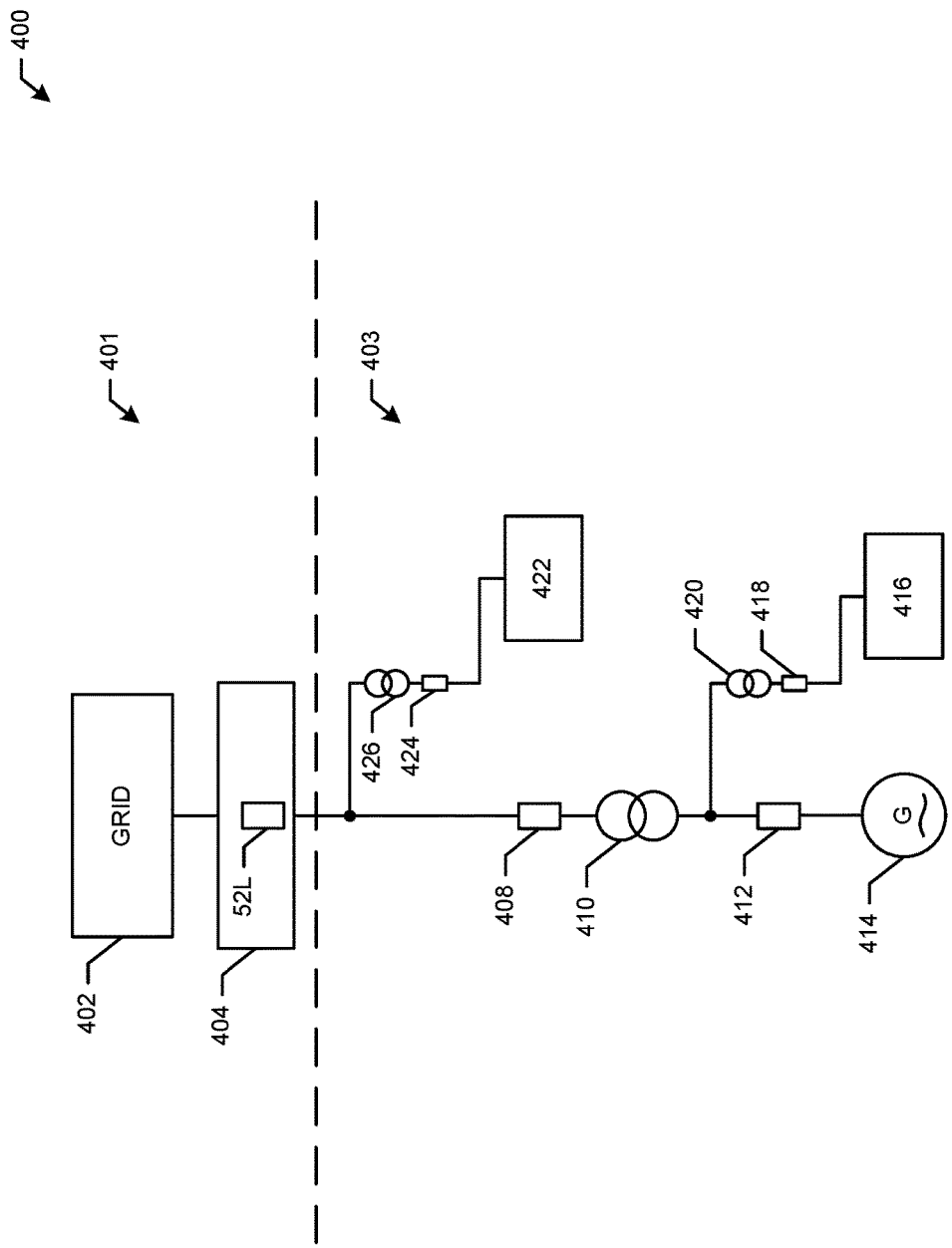

SYSTEMS AND METHODS FOR CONTROLLING A POWER GENERATION SYSTEM

TECHNICAL FIELD

The subject matter disclosed herein relates to control of a power generation system, for example, optimization of gas turbine power plant response during power system transients.

BACKGROUND

A power generation system can include a prime mover that generates electrical power from other primary energy sources. An exemplary prime mover, a gas turbine, is a rotary mechanical device with a gas turbine shaft that drives an electrical generator to supply electrical power to a transmission grid that supplies power to the ultimate users. Another exemplary prime mover is a steam turbine. For fault-free operation, the turbine shaft speed and resulting grid frequency must be maintained within operational ranges. When grid frequency changes abruptly due to a transient event, the turbine controller attempts to restore balance in the power generation system through control of the shaft speed.

A power generation system with a prime mover can include a turbine controller to bring the system back in balance following a transient event on the grid causing a frequency deviation. As an example, when a frequency drop in the grid is detected, a drop in speed of a turbine generator shaft can be detected, for example, because the speed moves with grid frequency. Accordingly, fuel intake by the prime mover may increase based on sensing the drop in speed, which can increase active power output in order to compensate for the drop in frequency. This may result in an increase in the electrical power beyond system limits and, consequently, shut off of fuel to the gas turbine (a condition that can be referred to as flame out). In addition, when a turbine controller tries to react to the fast grid frequency transients, the turbine controller may potentially affect the gas turbine's dynamic behavior. Such a sequence of events may occur because of the turbine controller's reactions to symptoms of the transient event on the grid without recognition of the transient grid event itself. In one embodiment, while a gas turbine is specifically discussed for explanatory purposes, the embodiments described herein apply to any prime mover and are not limited based on the exemplary system.

One challenge in controlling a power generation system (also referred to as a power system herein) is ensuring that the amount of active power consumed (for example, by loads on the power system) in addition to losses in the power system ideally equals the active power produced by the power system. For example, if more power is produced by the power system than consumed by loads and losses, the frequency of the output of the power system can increase. Moreover, deviations from the nominal frequency associated with the power system can damage synchronous machines and other appliances associated with the power system. In one embodiment, circuit breakers, devices that can be reset after they have broken current flow, can be used to control the power flow to various components of the grid and/or power system. In one embodiment, power system can further include switchgears, which can have a combination of electrical disconnect switches, fuses, and/or or circuit breakers to control, protect, and isolate electrical equipment. In another embodiment, switchgears can be used to de-energize equipment to allow work to be done, and to clear faults downstream.

A power system having a gas turbine feedback response mechanism that makes response decisions (for example, making changes to fuel stroke ratio (FSR), fuel splits, fuel bias, a dry low NOx (DLN) mode, or an inlet guide vane (IGV) angle, and the like) based on the speed of the turbine generator shaft alone may have faulty responses. For example, a speed increase in the turbine generator shaft could be a result of system fault or a remote breaker open (RBO) condition. However, a gas turbine feedback response mechanism that only considers feedback based on the speed of the turbine generator shaft may not be able to differentiate between a system fault and a RBO condition.

BRIEF DESCRIPTION OF THE DISCLOSURE

The disclosure relates to optimization of gas turbine power plant response during power system transients. In one embodiment, a method is provided. The method can include sensing a rate of change of electrical frequency at terminals of a generator. The method can also include determining, using a processor, a reactive current and a magnitude of a voltage at the terminals of the generator. Further, the method can include identifying a transient grid event based on an increase in the reactive current and a decrease in the magnitude of the voltage at substantially the same time for a specified duration. Moreover, the method can include facilitating an action to respond to the transient grid event based on the identification.

In one aspect of an embodiment, the method can include determining, using the processor, a reactive power at the terminals of the generator.

In one aspect of an embodiment, the method can include identifying the transient grid event based at least in part on an increase in the reactive power at substantially the same time and for a specified duration as the increase in the reactive current and the decrease in the magnitude of the voltage.

In one aspect of an embodiment, the identification of the transient grid event is performed in less than about 200 milliseconds.

In one aspect of an embodiment, the method can include identifying the transient grid event based at least in part on the rate of change of frequency measured at the generator terminals.

In one aspect of an embodiment, the action to respond to the transient grid event comprises changing at least one of a fuel stroke ratio, a fuel split, a fuel bias, a dry low NOx mode, or an inlet guide vane angle of the generator and/or gas turbine.

In another embodiment, a method is provided. The method can include sensing a rate of change of electrical frequency at terminals of a generator. The method can also include determining, using the processor, an electrical power at the terminals of the generator and a mechanical power at the shaft line of the generator. The method can further include determining an accelerator power based on a difference between the electrical power and mechanical power. Moreover, the method can include identifying a remote breaker open condition based on a determination that the increase in the accelerating power is beyond a first threshold.

In one aspect of an embodiment, the method can include identifying the remote breaker open condition based on determining an increase in a speed of a turbine associated with the generator at substantially the same time as the increase in the accelerating power beyond the first threshold.

In one aspect of an embodiment, the identification of the remote breaker open condition is performed in less than about 200 milliseconds.

In one aspect of an embodiment, the determining the electrical power at the terminals of the generator and the mechanical power at the shaft line of the generator can include determining a magnitude of the electrical power and a magnitude of the mechanical power, and a frequency of the electrical power, and a speed of a rotating shaft associated with the generator.

In yet another embodiment, a system can be provided. The system can include at least one processor, a generator having terminals, a controller, and a turbine. The system can be configured to sense a rate of change of electrical frequency at the terminals of the generator; determine, using the at least one processor, a reactive current and a magnitude of a voltage at the terminals of the generator; identify a transient grid event based on an increase in the reactive current and a decrease in the magnitude of the voltage at substantially the same time for a specified duration; and facilitate, by the controller, an action to respond to the transient grid event based on the identification.

In one aspect of an embodiment, the system is further configured to determine, using the processor, a reactive power at the terminals of the generator.

In one aspect of an embodiment, the system is further configured to identify the transient grid event based at least in part on an increase in the reactive power at substantially the same time and for a specified duration as the increase in the reactive current and the decrease in the magnitude of the voltage.

In one aspect of an embodiment, the system is further configured to identify the transient grid event is performed in less than about 200 milliseconds.

In one aspect of an embodiment, the system is further configured to identify the transient grid event based at least in part on the rate of change of frequency measured at the generator terminals.

In one aspect of an embodiment, the system is further configured to facilitate, by the controller, the action to respond to the transient grid event, is further configured to change at least of an fuel stroke ratio, a fuel split, a fuel bias, a dry low NOx mode, or an inlet guide vane angle of the turbine.

In one aspect of an embodiment, the system can further include a gas turbine droop controller configured to respond to a change in one or more of the reactive current, the magnitude of the voltage, the electrical frequency, or the reactive power having a magnitude greater than a first threshold at substantially the same time as the identification of the transient grid event.

In one aspect of an embodiment, the system is further configured to determine, using the processor, an electrical power at the terminals of the generator and a mechanical power at the shaft line of the generator; determine an accelerator power based on a difference between the electrical power and mechanical power; and identify a remote breaker open condition based on a determination that the increase in the accelerating power is beyond a first threshold.

In one aspect of an embodiment, the system is further configured to identify the remote breaker open condition based on determining an increase in a speed of a turbine associated with the generator at substantially the same time as the increase in the accelerating power beyond the first threshold.

In one aspect of an embodiment, the system is further configured to identify the remote breaker open condition in less than about 200 milliseconds.

In one aspect of an embodiment, the system configured to determine the electrical power at the terminals of the generator and the power generation system configured to determine the mechanical power further includes the power generation system being configured to determine a magnitude of the electrical power and a magnitude of the mechanical power, and a frequency of the electrical power and a speed of a rotating shaft associated with the generator.

These and other embodiments, aspects, and features will become more apparent from the following description taken in conjunction with the drawings.

BRIEF DESCRIPTION OF THE DRAWINGS

Figure 1:
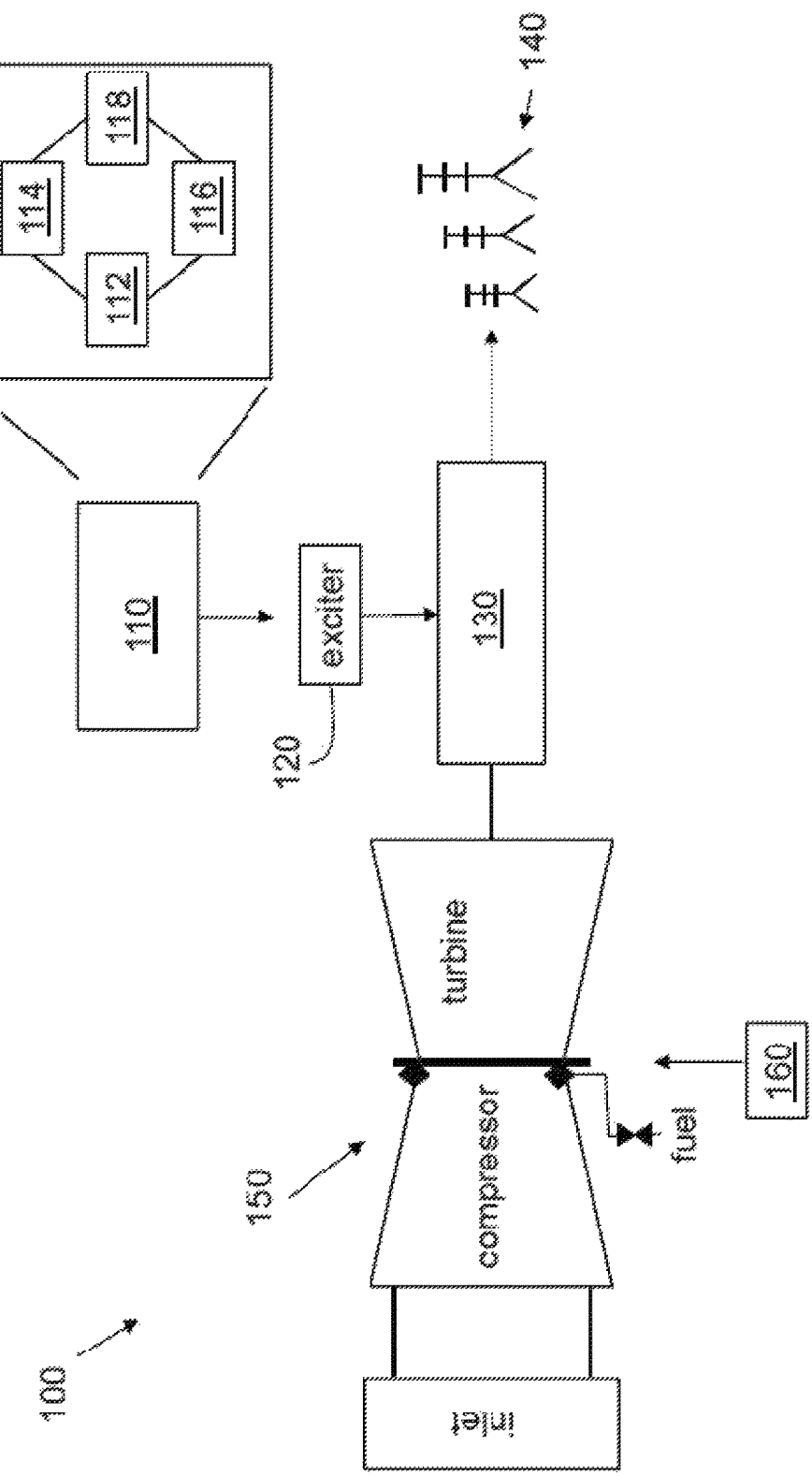
Figure 2:
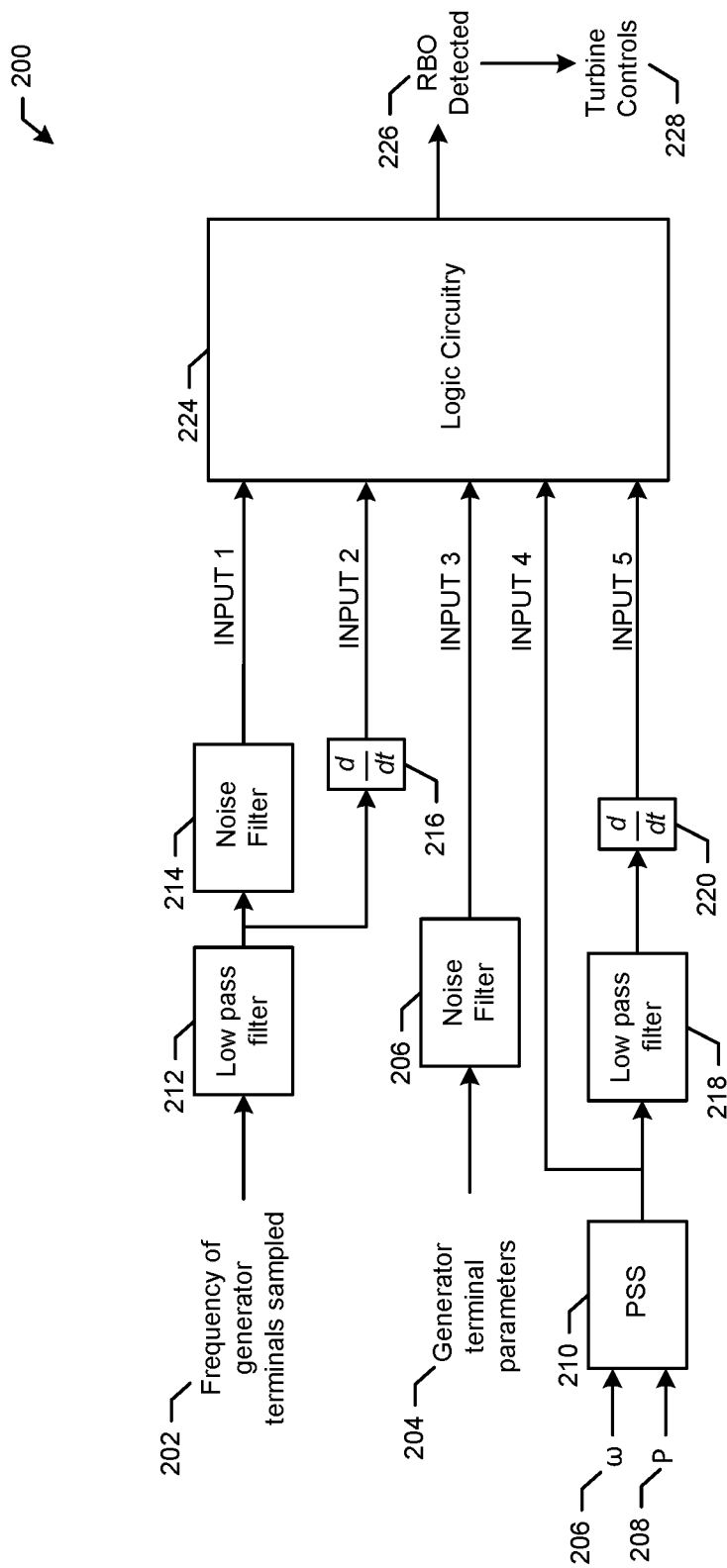
Figure 3:
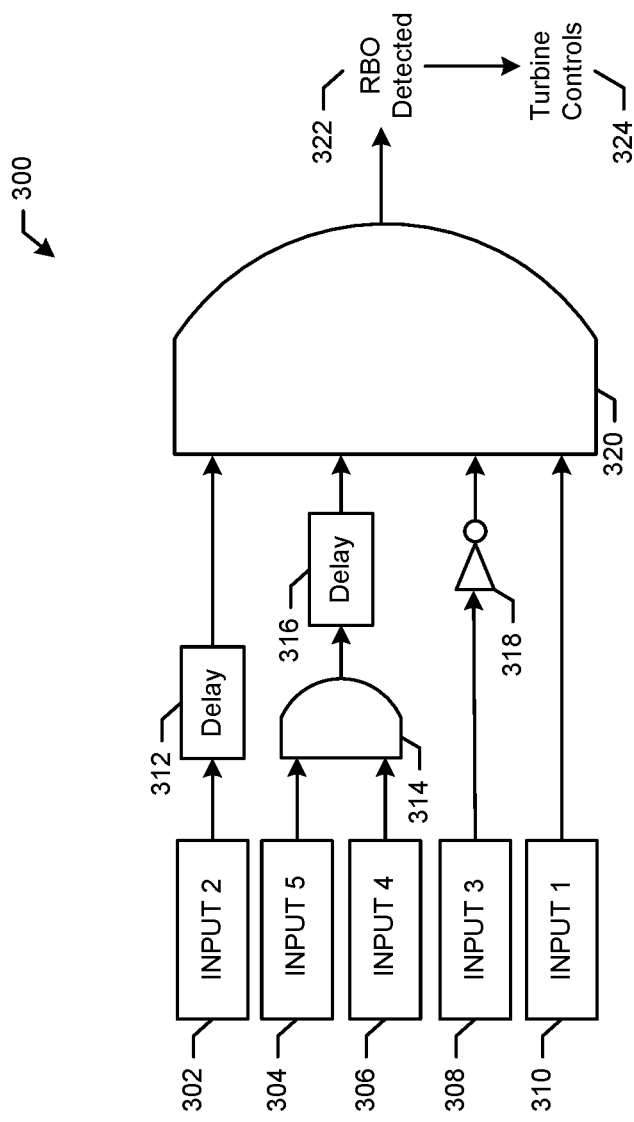
Figure 5A:
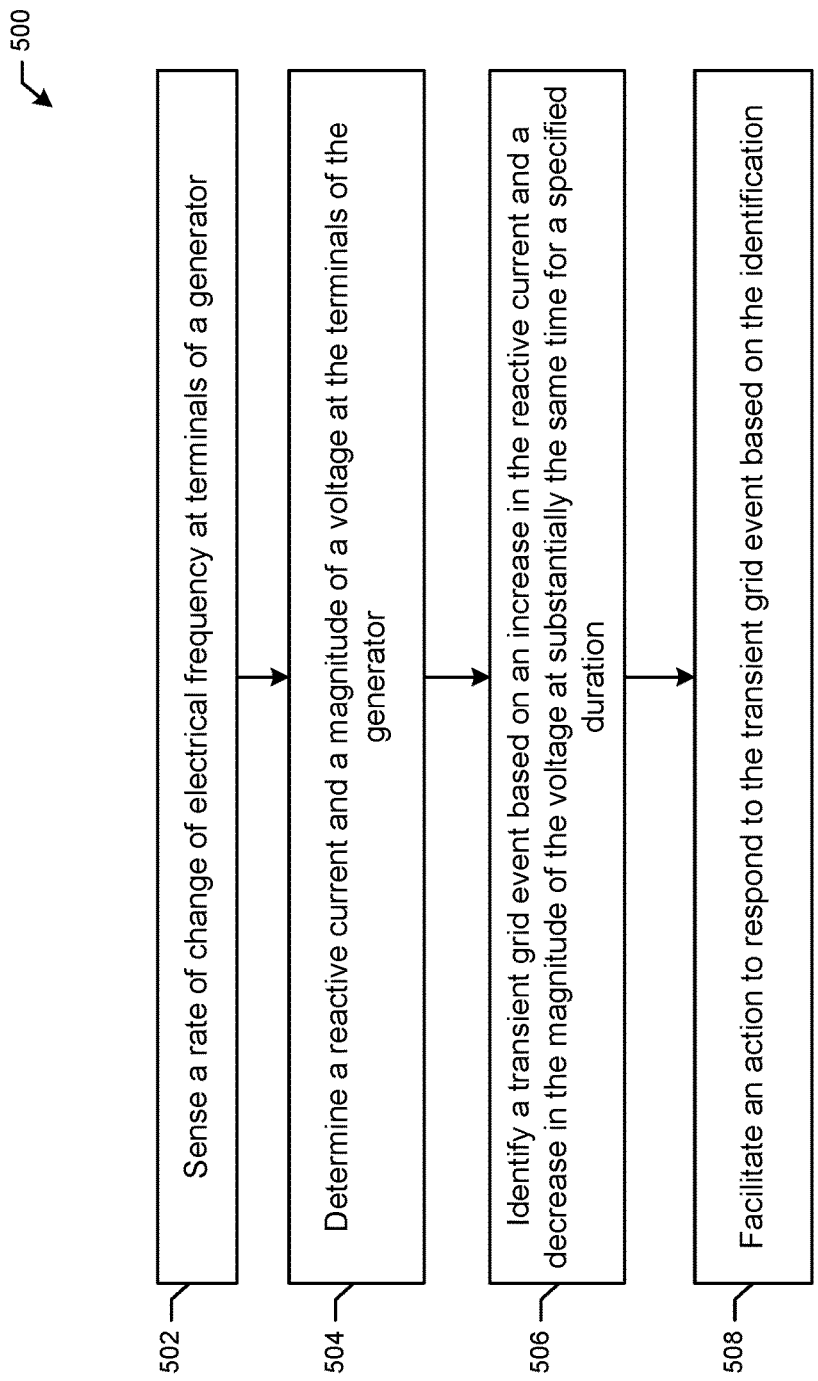
Figure 5B:
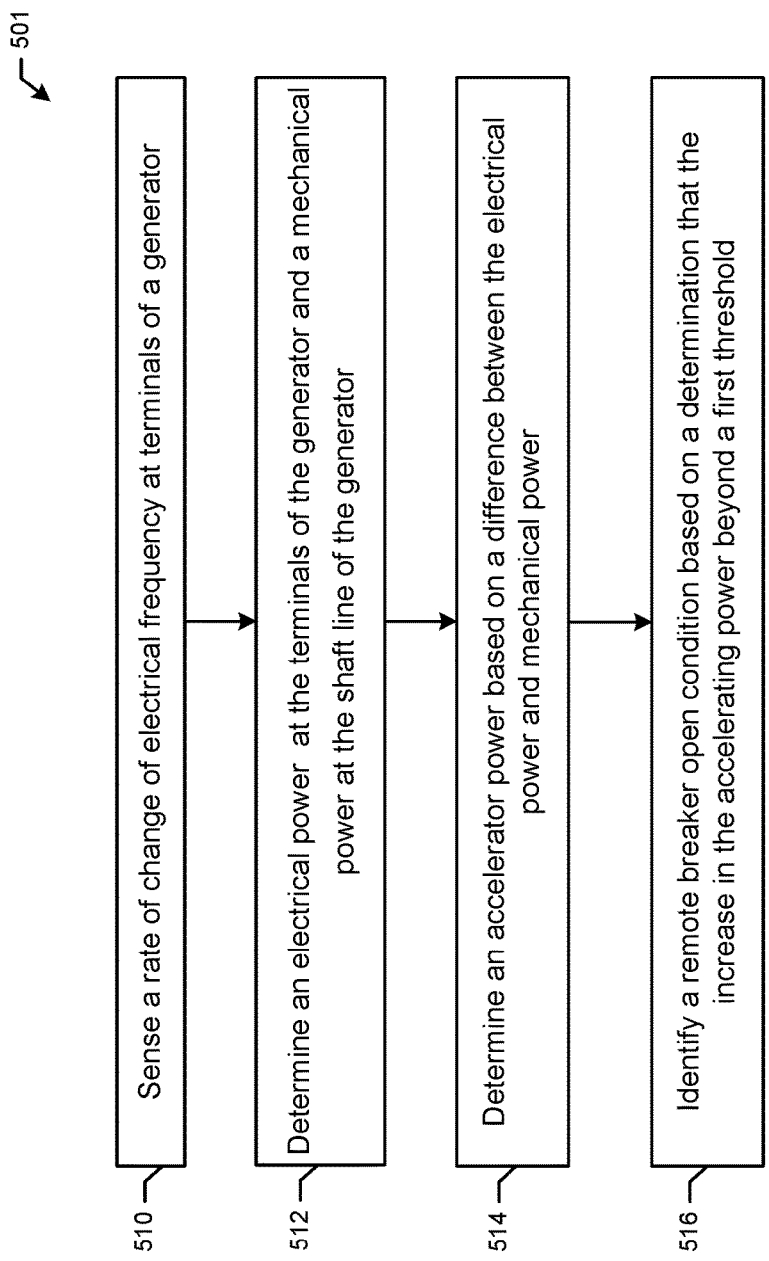

Having thus described the disclosure in general terms, reference will now be made to the accompanying drawings, which are not necessarily drawn to scale, and wherein:

FIG. 1 shows an example block diagram of a power generation system in accordance with certain embodiments of the disclosure;

FIG. 2 shows an example diagram that describes a control circuit of a power system in accordance with certain embodiments of the disclosure;

FIG. 3 shows an example diagram of operation of the control circuit shown and described in connection with FIG. 2, in accordance with certain embodiments of the disclosure;

FIG. 4 shows an example diagram showing a grid in relationship with one or more remote breakers in accordance with example embodiments of the disclosure; and FIGS. 5A-5B are flowcharts representing example methods of controlling a power system, in accordance with certain embodiments of the disclosure.

The detailed description explains embodiments of the disclosure, together with embodiments, aspects, and features, by way of example with reference to the drawings. The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, it should be understood that the word "line" as used herein generally refers to an electrical conductor, for example, a wire or an electrical power cable. The word "breaker" as used herein is not limited to a circuit breaker but generally refers to various types of protection elements that can be activated in order to protect a faulty transformer or equipment connected to a faulty transformer. The word "current" as used herein generally refers to an electrical current. Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

DETAILED DESCRIPTION OF THE DISCLOSURE

The disclosure relates to optimization of gas turbine power plant response during power system transients. In one embodiment, certain system and/or method embodiments can control a power system by determining and using the reactive component of the current and the magnitude of the voltage at the generator terminals. In another embodiment, if the magnitude of the voltage is decreasing and the reactive current is increasing at substantially the same time, this may be indicative of a potential power system fault. In one embodiment, the power system can confirm the occurrence of a power system fault if the reactive power of the power system increases at substantially the same time as the decrease in the magnitude of the voltage and the increase in the reactive current. Accordingly, the power system can identify a power system fault based on at least three conditions occurring for a specified duration and at substantially the same time: (1) an increase in the reactive current (2) a decrease in the magnitude of the voltage, and (3) an increase in the reactive power.

In one embodiment, the power system that identifies the three conditions mentioned above occurring for a specified duration and at substantially the same time, can then send information to a turbine control system saying that a power system fault has occurred. The turbine control system can take at least one action responsive to the occurrence of the power system fault. For example, the turbine control system can, change various power system properties, such as, the FSR, fuel splits, fuel bias, change in DLN modes, IGV angles, and the like. In one embodiment, the determination of the power system fault can be performed in less than about 200 milliseconds.

In one embodiment, the power system can further detect a RBO condition, and distinguish a RBO condition from a power system fault condition. In one embodiment, the power system can determine an electrical power at the generator terminals and a mechanical power at the shaft line of the generator. In another embodiment, the power system can determine the difference between the mechanical power and the electrical power determined at the generator terminals. In one embodiment, the difference between the mechanical power and the electrical power can be referred to as an accelerating power, that is, an accelerating power on the gas turbine shaft. In one embodiment, if the magnitude of the accelerating power changes beyond a predetermined threshold, then a load rejection event may be determined to have occurred and consequently, a RBO condition may be determined to have occurred. Further if the magnitude of the accelerating power changes beyond a predetermined threshold, then a change in speed of the shaft can be determined. If the speed of the shaft increases at substantially the same time as the change in the magnitude of the accelerating power beyond a predetermined threshold, then the condition can determined to be a RBO condition. In one embodiment, the determination of the RBO condition and/or the RBO condition is performed in less than about 200 milliseconds.

In various embodiments the disclosed systems, methods, and apparatus can serve to reduce false triggering of power system faults and RBO conditions, and thereby enhance the turbine performance. For example, the disclosed systems, methods, and apparatus can at least partially reduce the occurrence of unnecessary drifts in FSR, fuel splits, fuel bias, change in DLN modes, IGV angles, and the like. In one embodiment, the disclosed systems, methods, and apparatus can thereby help the gas turbine combustion system operate with higher stability and efficiency. Further, the power system ability to differentiate frequency events from power system faults, can serve to increase power system availability and reliability, reinforce the power system, and avoid regional blackouts.

FIG. 1 is a block diagram of a power generation system 100 including an exciter controller 110 according to an embodiment of the disclosure. The power generation system 100 includes a gas turbine 150 that couples to a generator 130 that supplies the grid 140. The gas turbine 150 is also coupled to a turbine controller 160. The generator 130 is coupled to an exciter 120 that is controlled by an exciter controller 110. The embodiments detailed herein are discussed with reference to the exciter controller 110 for explanatory purposes but may be implemented in one or more other subsystems of the power generation system 100 in other embodiments. The exciter controller 110 can be a computing system that includes an input interface 112, an output interface 118, one or more processors 114, and one or more memory devices 116. The exciter controller 110 facilitates recognition of a power system fault and/or a RBO condition and aids in the control of the power generation system 100 as detailed herein. In other embodiments, a controller separate from the exciter controller 110 can be used. That is, while the exciter controller 110 is specifically discussed for explanatory purposes, any controller that monitors the generator 130 and includes the functionality of the exciter controller 110 discussed with reference to embodiments of the disclosure may be used. In one embodiment, the exciter controller 110 of the power generation system can analyze the electrical signatures from gas turbine terminals and can differentiate system faults and load rejection conditions using certain embodiments of the systems, methods, and apparatus disclosed herein.

FIG. 2 shows an example diagram 200 that describes the control of a power system, in accordance with example embodiments of the disclosure. In one embodiment, the diagram 200 shows that the frequency at the generator terminals 202 (for example, the generator terminals of the generator 150 shown and described in connection with FIG. 1) can be measured and used for the determination of a RBO condition, as described further below. In another embodiment, the generator terminal parameters 204 (for example, the generator terminal parameters such as voltage, current, slip, and the like of the generator 150 shown and described in connection with FIG. 1) can be measured and used for the determination of an RBO condition, as described further below. In one embodiment, the magnitude 206 of the electrical power and the mechanical power, and the frequency 206 of the electrical power and the mechanical power can be measured and used for the determination of a RBO condition, as described further below.

In one embodiment, the frequency at the generator terminals 202 can be fed into a low pass filter 212. In one embodiment, the low pass filter 212 can include a first order low pass filter. In another embodiment, the first order low pass filter 212 can have a time constant of about 50 milliseconds. In one embodiment, the output from the low pass filter 212 can be fed into a noise filter 214. In one embodiment, the noise filter 214 can serve to at least partially remove noise in the measured frequency at the generator terminals 202 after passage through the low pass filter 212. In another embodiment, the output of the noise filter 214 can be considered as input 1, which can be fed into a logic circuit 224 and used for the determination of a RBO condition, the operations of which are further shown and described in connection with FIG. 3, below. In one embodiment, input 1 can represent the regularity in the measured frequency sampled at the generator terminals 202. In another embodiment, this can be accomplished using, for example, a notch filter (not shown), in order to measure deviations and/or drifts in frequency over time.

In one embodiment, the output from the low pass filter 212 can have its derivative 216 taken, in order to measure rate of change of frequency measured at the generator terminals 202. In one embodiment, the derivative 216 can have an associated time constant that can be approximately 150 milliseconds. In another embodiment, the output of the derivative 216 of the low pass filter 212 can be considered as input 2, which can be fed into a logic circuit 224 for the determination of a RBO condition.

In one embodiment, the generator terminal parameters 204 can be fed into a noise filter 206 to remove noise in the measured generator terminal parameters 204. In one embodiment, the generator terminal parameters 204 can include, for example, parameters such as voltage, current, slip, and the like of the generator 150 shown and described in connection with FIG. 1.

In one embodiment, the magnitude 208 of the electrical power and the mechanical power, and the frequency 206 of the electrical power and the mechanical power can be measured. In one embodiment, an accelerating power can be determined, for example, at a power system stabilizer (PSS). In one embodiment, the PSS can refer to a supplementary excitation controller used to damp generator electro-mechanical oscillations. In one embodiment, the accelerating power can be equal to the difference in the mechanical power and the electrical power. In one embodiment, the accelerating power can be considered as input 4, which can be fed into a logic circuit 224 for the determination of a RBO condition, the operations of which are further shown and described in connection with FIG. 3, below.

In one embodiment, the accelerating power can further be fed into a low pass filter 218. In one embodiment, the low pass filter 218 can include a first order low pass filter. In another embodiment, the output from the low pass filter 218 can have its derivative 220 taken, in order to measure rate of change of the accelerating power 218 post-filtering. In one embodiment, the rate of change in the accelerating power can be considered as input 5, which can be fed into a logic circuit 224 for the determination of a RBO condition.

FIG. 3 shows an example diagram 300 of the operating of the logic circuit 224 shown and described in connection with FIG. 2, in accordance with example embodiments of the disclosure. In one embodiment, the inputs to the logic circuit 224 can include input 2 302, input 5 304, input 4 306, input 3 308, and input 1 310.

In one embodiment, input 2 302 can reflect the output of the derivative 216 of the low pass filter 212 shown and described in connection with FIG. 2. In another embodiment, input 2 302 can be fed into a delay block 312. In another embodiment, the delay block 312 can serve to ensure against false indications. That is, the delay blocks can serve to ensure that the input signals are moving in a specific direction, at least for 3 to 5 power cycles. For example, for a power system operating at approximately 50 Hz (20 milliseconds can represent one power cycle); accordingly, an approximately 3 power cycle delay can serve this purpose. In one embodiment, the output from the delay bock 312 can be fed into a four terminal AND gate 320 for the determination of a RBO condition.

In one embodiment, input 5 304 can reflect the output of the low pass filter 218 and the derivative 220 shown and described in connection with FIG. 2. In another embodiment, input 5 304 can be fed into a two terminal AND block 314, along with input 4 306, described below. In another embodiment, the output of the two terminal AND block 314 can be fed into a second delay block 316, which can serve to ensure against false indications. That is, the delay blocks can serve to ensure that the input signals are moving in a specific direction, at least for 3 to 5 power cycles. For example, for a power system operating at approximately 50 Hz (20 milliseconds can represent one power cycle); accordingly, an approximately 3 power cycle delay can serve this purpose. In one embodiment, the output from the delay block 316 can be fed into the four terminal AND gate 320 for the determination of a RBO condition.

In one embodiment, input 4 306 can reflect the output (magnitude and frequency of mechanical and/or electrical power) associated with the PSS 210 as shown and described in connection with FIG. 2. In another embodiment, input 4 306 can be fed into a two terminal AND block 314, along with input 5 304. In another embodiment, the output of the two terminal AND block 314 can be fed into a second delay block 316, which can serve to ensure that the input signals are moving in a specific direction, at least for 3 to 5 power cycles. In one embodiment, the output from the delay block 316 can be fed into the four terminal AND gate 320 for the determination of a RBO condition.

In one embodiment, input 3 308 can reflect the output of the generator terminal parameters 204 after the application of a noise filter 206, as shown and described in connection with FIG. 2. In another embodiment, input 3 308 can be fed into a NOT gate 318. In one embodiment, the output from the not gate 318 can be fed into the four terminal AND gate 320 for the determination of a RBO condition. In one embodiment, a high value on input 3 can represent a power system fault detection.

In one embodiment, input 1 310 can reflect the output of the frequency of generator terminals sampled 202 and fed into a low pass filter 212 and a noise filter 214, as shown and described in connection with FIG. 2. In another embodiment, input 1 310 can be fed into the four terminal AND gate 320 for the determination of a RBO condition.

In one embodiment, the four terminal AND gate 320 can use various signals at its input (that is, the various signals based on input 2 302, input 5 304, input 4 306, input 3 308, and input 1 310) as described above, to detect a RBO 322 condition. In one embodiment, the RBO 322 condition can be determined to exist if all of the signals inputted to the 4 terminal AND block 320 take a high value (for example, 1), that is, the signals do not take a low value (for example, 0).

In one embodiment, if a RBO is detected 322, then a signal can be sent to turbine controls 324. Thereafter, the turbine control 324 can take at least one action based on the detected RBO 322. For example, the turbine control 324 can take at least one action responsive to the occurrence of the power system fault. For example, the turbine control 324 can change various power system properties, such as, the FSR, fuel splits, fuel bias, change in DLN modes, IGV angles, and the like.

In one embodiment, a first condition can be defined. In another embodiment, the first condition can include the RBO detection returning false (that is, having a input that is low), for example, as results of any number of blocks returning false or low in the four terminal AND gate 320, but input 3 returns true (that is, having an input that is high), for example, as a result of a power system fault detection. In one embodiment, one or more actions can be performed by a controller, for example, a turbine control 324, responsive to the occurrence of the first condition. example, a gas turbine droop governor and/or controller (not shown) can be configured to take at least one action, such as responding, at a predetermined rate, to longer-term grid load shifts at substantially the same time as the occurrence of the first condition. In one embodiment, droop control can refer to a speed control mode of a prime mover driving a synchronous generator connected to an electrical grid. In another embodiment, this mode can allow synchronous generators to run in parallel, so that loads are shared among generators in proportion to their power rating. In one embodiment, long term grid load shifts can refer to grid load shifts having a frequency of occurrence below a predetermined threshold. In one embodiment, the gas turbine droop governor and/or controller may not respond if there are high-frequency fluctuations in one or more grid parameters. In one embodiment, high-frequency fluctuations in one or more grid parameters can refer to fluctuations in one or more grid parameters having a frequency of occurrence above a predetermined threshold. In one embodiment, the gas turbine droop governor and/or controller can be configured to respond automatically and be continuously adjusted in real-time or in near real-time. In one embodiment, the gas turbine droop governor and/or controller can be included as a part of an exciter controller, for example, as additional logic implemented in the exciter controller.

FIG. 4 shows an example diagram 400 showing a grid in relationship with one or more remote breakers in accordance with example embodiments of the disclosure. In one embodiment, the diagram 400 includes a grid side 401 comprising a grid 402 and a circuit breaker 404, for example, circuit breaker 52L. In another embodiment, the diagram 400 includes a customer side. In one embodiment, the customer side 403. In one embodiment, the customer side 403 can include plant loads 422 connected to the grid side 401 by a transformer 426 and/or a circuit breaker 424. In another embodiment, the customer side 403 can include a gas turbine generator 414 and at least one auxiliary unit 416. In one embodiment, the gas turbine generator 414 can be connected to the grid side 401 through circuit breaker 412 connected to a generator step-up transformer 410 and another circuit breaker 408. In another embodiment, the auxiliary unit 416 can be connected to the grid through a circuit breaker 418 and a auxiliary transformer 420 in addition to the generator step-up transformer 410 and circuit breaker 408. In one embodiment, the systems, methods, and apparatus described herein can be used to identify a remote breaker open conditions using circuit breaker 408, circuit breaker 404, and/or circuit breaker 412, with or without out direct feedback.

FIG. 5A is a flowchart 500 that represents an example method of controlling a power system, in accordance with certain embodiments of the disclosure. In block 502, a rate of change of electrical frequency at the terminals of a generator can be sensed. In one embodiment, the frequency at the generator terminals can be fed into a low pass filter. In one embodiment, the low pass filter can include a first order low pass filter. In another embodiment, the first order low pass filter can have a time constant of about 50 milliseconds. In one embodiment, the output from the low pass filter can be fed into a noise filter to remove noise in the measured frequency at the generator terminals after passage through the low pass filter, and then fed into a logic circuit to determine a RBO condition, as shown and described in connection with FIGS. 2 and 3. In one embodiment, the processing of the rate of change of electrical frequency at the terminals of a generator as described above can reflect the regularity in the measured frequency sampled at the generator terminals. In another embodiment, this can be accomplished using, for example, a notch filter in order to measure deviations and/or drifts in frequency over time.

As mentioned, in one embodiment, the frequency at the generator terminals can be fed into a low pass filter. In one embodiment, the output from the low pass filter can have its derivative taken, in order to measure rate of change of frequency measured at the generator terminals. In one embodiment, the derivative can have an associated time constant that can be approximately 150 milliseconds. In another embodiment, the output of the derivative of the low pass filter can be fed into a logic circuit to determine a RBO condition, as shown and described in connection with FIGS. 2 and 3.

In block 504, a reactive current and a magnitude of a voltage at the terminals of the generator can be determined. In another embodiment, if the magnitude of the voltage is decreasing and the reactive current is increasing at substantially the same time, this may be indicative of a potential power system fault. In one embodiment, a reactive power at the terminals of the generator can be determined. In one embodiment, the power system can confirm the occurrence of a power system fault if the reactive power of the power system increases at substantially the same time as the decrease in the magnitude of the voltage and the increase in the reactive current.

In block 506, a transient grid event based on an increase in the reactive current and a decrease in the magnitude of the voltage at substantially the same time for a specified duration can be identified. Accordingly, in various embodiments, the power system can identify a power system fault based on at least three conditions occurring for a specified duration and at substantially the same time: (1) an increase in the reactive current (2) a decrease in the magnitude of the voltage, and (3) an increase in the reactive power.

In block 508, an action to respond to the transient grid event based on the identification can be facilitated. In one embodiment, the power system can send information to a turbine control system indicating that a power system fault has occurred. The turbine control system can take at least one action responsive to the occurrence of the power system fault. For example, the turbine control system can, change various power system properties, such as, the FSR, fuel splits, fuel bias, change in DLN modes, IGV angles, and the like. In one embodiment, the determination of the power system fault can be performed in less than about 200 milliseconds.

FIG. 5B is another flowchart 501 that represents an example method of controlling a power system, in accordance with certain embodiments of the disclosure. In block 510, the rate of change of electrical frequency at the terminals of a generator can be sensed. In one embodiment, the frequency at the generator terminals can be fed into a low pass filter. In one embodiment, the low pass filter can include a first order low pass filter. In another embodiment, the first order low pass filter can have a time constant of about 50 milliseconds. In one embodiment, the output from the low pass filter can be fed into a noise filter to remove noise in the measured frequency at the generator terminals after passage through the low pass filter so that it can be used for the determination of a RBO condition, for example, as shown and described in connection with FIGS. 2 and 3. In one embodiment, the processing of the rate of change of electrical frequency at the terminals of a generator as described above can reflect the regularity in the measured frequency sampled at the generator terminals. In another embodiment, this can be accomplished using, for example, a notch filter in order to measure deviations and/or drifts in frequency over time.

As mentioned, in one embodiment, the frequency at the generator terminals can be fed into a low pass filter. In one embodiment, the output from the low pass filter can have its derivative taken, in order to measure rate of change of frequency measured at the generator terminals. In one embodiment, the derivative can have an associated time constant that can be approximately 150 milliseconds. In another embodiment, the output of the derivative of the low pass filter can be used for the determination of a RBO condition, for example, as shown and described in connection with FIGS. 2 and 3.

In block 512, an electrical power at the terminals of the generator and a mechanical power at the shaft line of the generator can be determined. In one embodiment, the magnitude of the electrical power and the mechanical power, and the frequency of the electrical power and the mechanical power can be measured. In one embodiment, the magnitude of the electrical power and the mechanical power, and the frequency of the electrical power and the mechanical power can be determined, for example, at a power system stabilizer (PSS). In one embodiment, an accelerating power can be equal to the difference in the mechanical power and the electrical power.

In one embodiment, the accelerating power can further be fed into a low pass filter. In one embodiment, the low pass filter can include a first order low pass filter. In another embodiment, the output from the low pass filter can have its derivative taken, in order to measure rate of change of the accelerating power post-filtering. In one embodiment, the rate of change in the accelerating power can be used for the determination of a RBO condition, for example, as shown and described in connection with FIGS. 2 and 3 and related description.

In block 514, an accelerator power can be determined based on a difference between the electrical power and mechanical power. In one embodiment, the magnitude of the electrical power and the mechanical power, and the frequency of the electrical power and the mechanical power can be measured. In one embodiment, the accelerating power can be determined, for example, at a power system stabilizer (PSS). In one embodiment, the accelerating power can be equal to the difference in the mechanical power and the electrical power. In one embodiment, this accelerating power can be used for the determination of a RBO condition, for example, as shown and described in connection with FIGS. 2 and 3.

In one embodiment, the accelerating power can be fed into a low pass filter. In one embodiment, the low pass filter can include a first order low pass filter. In another embodiment, the output from the low pass filter can have its derivative taken, in order to measure rate of change of the accelerating power post-filtering. In one embodiment, the rate of change in the accelerating power can be used for the determination of a RBO condition, for example, as shown and described in connection with FIGS. 2 and 3.

In block 516, a remote breaker open condition can be identified based on a determination that the increase in the accelerating power beyond a first threshold. In one embodiment, the remote breaker open condition can be identified as a as a RBO condition based on determining an increase in a speed of a turbine associated with the generator at substantially the same time as the increase in the accelerating power beyond the first threshold. In one embodiment, the identification of the remote breaker open condition can be performed in less than about 200 milliseconds.

In one embodiment, the power system can thereby send information to a turbine control system saying that a RBO condition has occurred. The turbine control system can take at least one action responsive to the occurrence of the RBO condition. For example, the turbine control system can, change various power system properties, such as, the FSR, fuel splits, fuel bias, change in DLN modes, IGV angles, and the like.

In one embodiment, the various systems, methods, and apparatus described herein can be performed using memory and/or one or more processors. In one embodiment, the one or more processors can be configured to communicatively cooperate with a memory. The processors can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory and executed by the processor.

The memory can be used to store program instructions that are loadable and executable by the processor, as well as to store data generated during the execution of these programs. Depending on the configuration and type of the diagnostic apparatus, the memory can be volatile (such as random access memory (RAM)) and/or non-volatile (such as read-only memory (ROM), flash memory, etc.). In some embodiments, the memory devices can also include additional removable storage (not shown) and/or non-removable storage (not shown) including, but not limited to, magnetic storage, optical disks, and/or tape storage. The disk drives and their associated computer-readable media can provide non-volatile storage of computer-readable instructions, data structures, program modules, and other data. In some implementations, the memory can include multiple different types of memory, such as static random access memory (SRAM), dynamic random access memory (DRAM), or ROM.

The memory, the removable storage, and the non-removable storage are all examples of non-transient or non-transitory computer-readable storage media. Such non-transient computer-readable storage media can be implemented in any method or technology for storage of information such as computer-readable instructions, data structures, program modules or other data. Additional types of non-transient computer storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor. Combinations of any of the above should also be included within the scope of non-transient or non-transitory computer-readable media.

Turning to the contents of the memory, the memory include, but is not limited to, an operating system (OS) and one or more application programs or services for implementing the features and aspects disclosed herein. Such applications or services can include a power system fault and RBO detection module. In one embodiment, the power system fault and RBO detection module can be implemented by software that is provided in configurable control block language and is stored in non-volatile memory. When executed by the processor, the power system fault and RBO detection module can implement the various functionalities and features described in this disclosure.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controlling a power generation system, the method comprising:
    sensing a rate of change of electrical frequency at terminals of a generator by inputting the electrical frequency to a low pass filter and determining a derivative of an output from the low pass filter;
    determining, using a processor, based on the derivative, a reactive current and a magnitude of a voltage at the terminals of the generator;
    identifying a transient grid event based on an increase in the reactive current and a decrease in the magnitude of the voltage at substantially the same time for a specified duration; and
    facilitating an action to respond to the transient grid event based on the identification.

2. The method of claim 1, further comprising determining, using the processor, a reactive power at the terminals of the generator.

3. The method of claim 1, further comprising identifying the transient grid event based at least in part on an increase in the reactive power at substantially the same time and for a specified duration as the increase in the reactive current and the decrease in the magnitude of the voltage.

4. The method of claim 1, wherein the identification of the transient grid event is performed in less than about 200 milliseconds.

5. The method of claim 1, further comprising identifying the transient grid event based at least in part on the rate of change of frequency measured at the generator terminals.

6. The method of claim 1, wherein the action to respond to the transient grid event comprises changing at least one of a fuel stroke ratio, a fuel split, a fuel bias, a dry low NOx mode, or an inlet guide vane angle of the generator.

7. A method of controlling a power generation system, the method comprising:
    sensing a rate of change of electrical frequency at terminals of a generator by inputting the electrical frequency to a low pass filter and determining a derivative of an output from the low pass filter;
    determining, using the processor, based on the derivative, an electrical power and a mechanical power at a shaft line of the generator;
    determining an accelerator power based on a difference between the electrical power and mechanical power; and
    identifying a remote breaker open condition based on a determination that the increase in the accelerating power beyond a first threshold.

8. The method of claim 7, further comprising identifying the remote breaker open condition based on determining an increase in a speed of a turbine associated with the generator at substantially the same time as the increase in the accelerating power beyond the first threshold.

9. The method of claim 7, wherein the identification of the remote breaker open condition is performed in less than about 200 milliseconds.

10. The method of claim 7, wherein determining the electrical power and the mechanical power at the at a shaft line of the generator comprises determining a magnitude of the electrical power and a magnitude of the mechanical power, and a frequency of the electrical power and a speed of a rotating shaft associated with the generator.

11. A system, comprising:
    a power generation system comprising at least one processor and including a generator having terminals;
    a controller; and
    a turbine;
    wherein the power generation system is configured to:
        sense a rate of change of electrical frequency at the terminals of the generator by inputting the electrical frequency to a low pass filter and determining a derivative of an output from the low pass filter;
        determine, using the at least one processor, based on the derivative, a reactive current and a magnitude of a voltage at the terminals of the generator;
        identify a transient grid event based on an increase in the reactive current and a decrease in the magnitude of the voltage at substantially the same time for a specified duration; and
        facilitate, by the controller, an action to respond to the transient grid event based on the identification.

12. The system of claim 11, wherein the power generation system is further configured to determine, using the processor, a reactive power at the terminals of the generator.

13. The system of claim 11, wherein the power generation system is further configured to identify the transient grid event based at least in part on an increase in the reactive power at substantially the same time and for a specified duration as the increase in the reactive current and the decrease in the magnitude of the voltage.

14. The system of claim 11, wherein the power generation system is further configured to identify the transient grid event based at least in part on the rate of change of frequency measured at the generator terminals.

15. The system of claim 11, wherein the facilitating, by the controller, the action to respond to the transient grid event further comprises changing at least of an fuel stroke ratio, a fuel split, a fuel bias, a dry low NOx mode, or an inlet guide vane angle of the generator.

16. The system of claim 11, wherein the system further comprises a gas turbine droop controller configured to respond to a change in one or more of the reactive current, the magnitude of the voltage, the electrical frequency, or the reactive power having a magnitude greater than a first threshold at substantially the same time as the identification of the transient grid event.

17. The system of claim 11, wherein the power generation system is further configured to:
    determine, using the processor, an electrical power and at the terminals of the generator;
    determine a mechanical power of the generator;
    determine an accelerator power based on a difference between the electrical power and mechanical power; and identify a remote breaker open condition based on a determination that the increase in the accelerating power is beyond a first threshold.

18. The system of claim 17, wherein the power generation system is further configured to identify the remote breaker open condition based on determining an increase in a speed of a turbine associated with the generator at substantially the same time as the increase in the accelerating power beyond the first threshold.

19. The system of claim 17, wherein the power generation system is further configured to identify the remote breaker open condition in less than about 200 milliseconds.

20. The system of claim 17, wherein the power generation system being configured to determine the electrical power at the terminals of the generator and the power generation system being configured to determine the mechanical power further comprises the power generation system being configured to determine a magnitude of the electrical power and a magnitude of the mechanical power, and a frequency of the electrical power and a speed of a rotating shaft associated with the generator.

* * * * *